United States Patent [19]

Dibbern, Jr. et al.

[11] Patent Number: 4,558,189
[45] Date of Patent: Dec. 10, 1985

[54] REVERSING SWITCH

[75] Inventors: John E. Dibbern, Jr., Street; Gregory E. Moores, Reisterstown, both of Md.

[73] Assignee: Black & Decker Inc., Newark, Del.

[21] Appl. No.: 636,161

[22] Filed: Jul. 31, 1984

Related U.S. Application Data

[62] Division of Ser. No. 480,781, Mar. 31, 1983, Pat. No. 4,523,116.

[51] Int. Cl.⁴ .................. H01H 9/00; H01H 21/62
[52] U.S. Cl. .................. 200/1 V; 200/8 R; 200/11 G
[58] Field of Search ............ 200/1 R, 1 V, 5 R, 11 R, 200/11 A, 11 G, 11 J, 11 K, 11 TW, 8 R, 8 A, 155 R, 155 A, 157

[56] References Cited

U.S. PATENT DOCUMENTS 2,100,426 11/1937 Berger et al. .............. 200/155 A X
2,201,882 5/1940 Bryant et al. ................ 200/155 A
2,921,147 1/1960 Hutt ............................ 200/1 V
3,467,801 9/1969 Matthews ...................... 200/1 V X
4,212,000 7/1980 Yamada ........................ 200/11 R Primary Examiner—J. R. Scott
Attorney, Agent, or Firm—Ronald B. Sherer; Harold Weinstein; J. Bruce Hoofnagle

[57] ABSTRACT

Two pairs of contact strips are mounted on the respective bridge members of an integral web portion of the molded field case of a power tool or other motor-driven device. The forward ends of the contact strips are cantilever mounted and automatically engage the respective terminals on the field, as the field is inserted into the field case and is secured therein. An annular wire harness is mounted on the rear bearing boss of the field case. Spaced contacts are carried by the wire harness and engage the respective ends of the first pair of contact strips. The respective ends of the second pair of contact strips are connected to terminals on the ends of the brush shunts. In a reversing embodiment, a third pair of contact strips is mounted on the bridge, and a rotatable reversing subassembly is mounted on the rear bearing boss in lieu of the wire harness.

13 Claims, 27 Drawing Figures

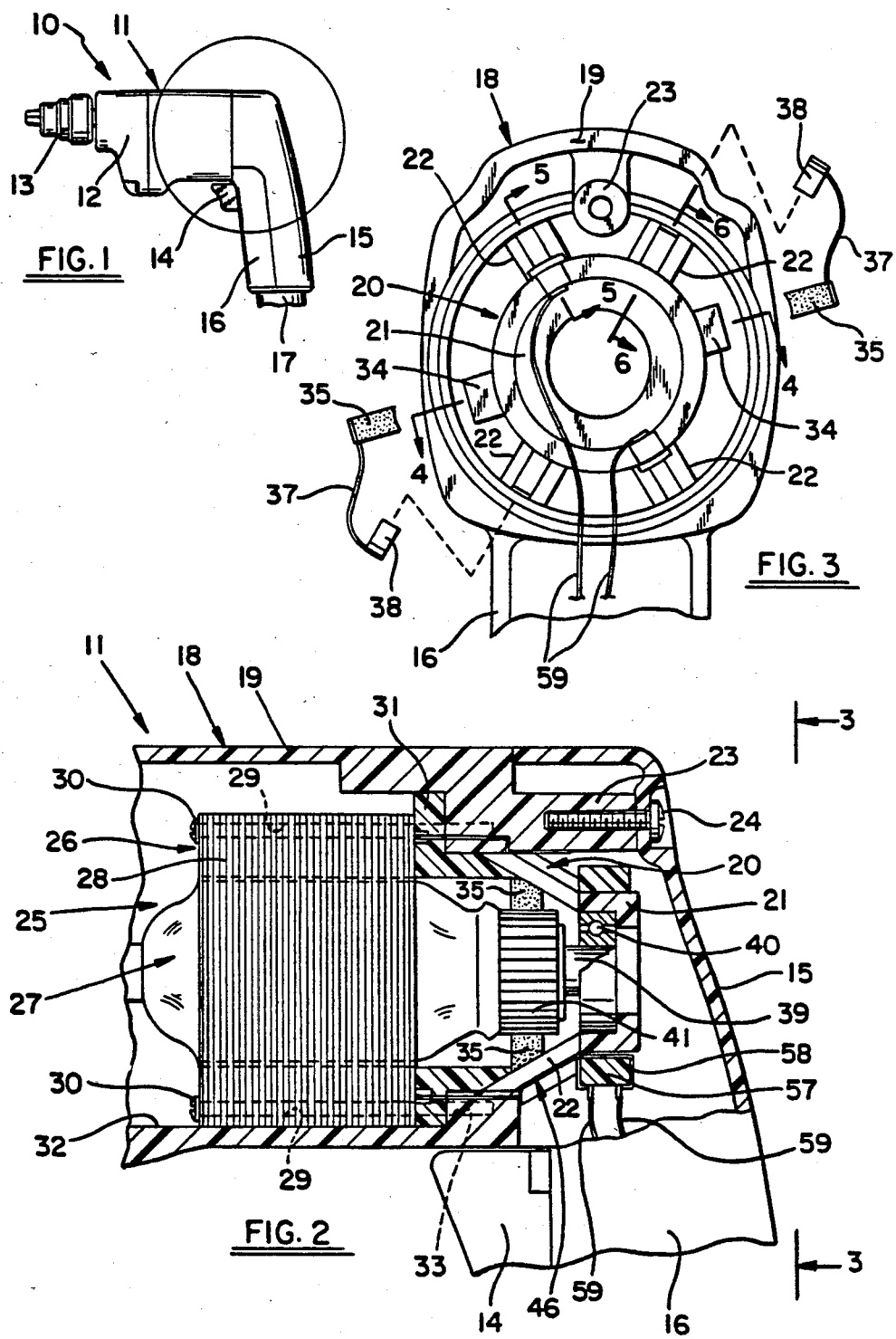

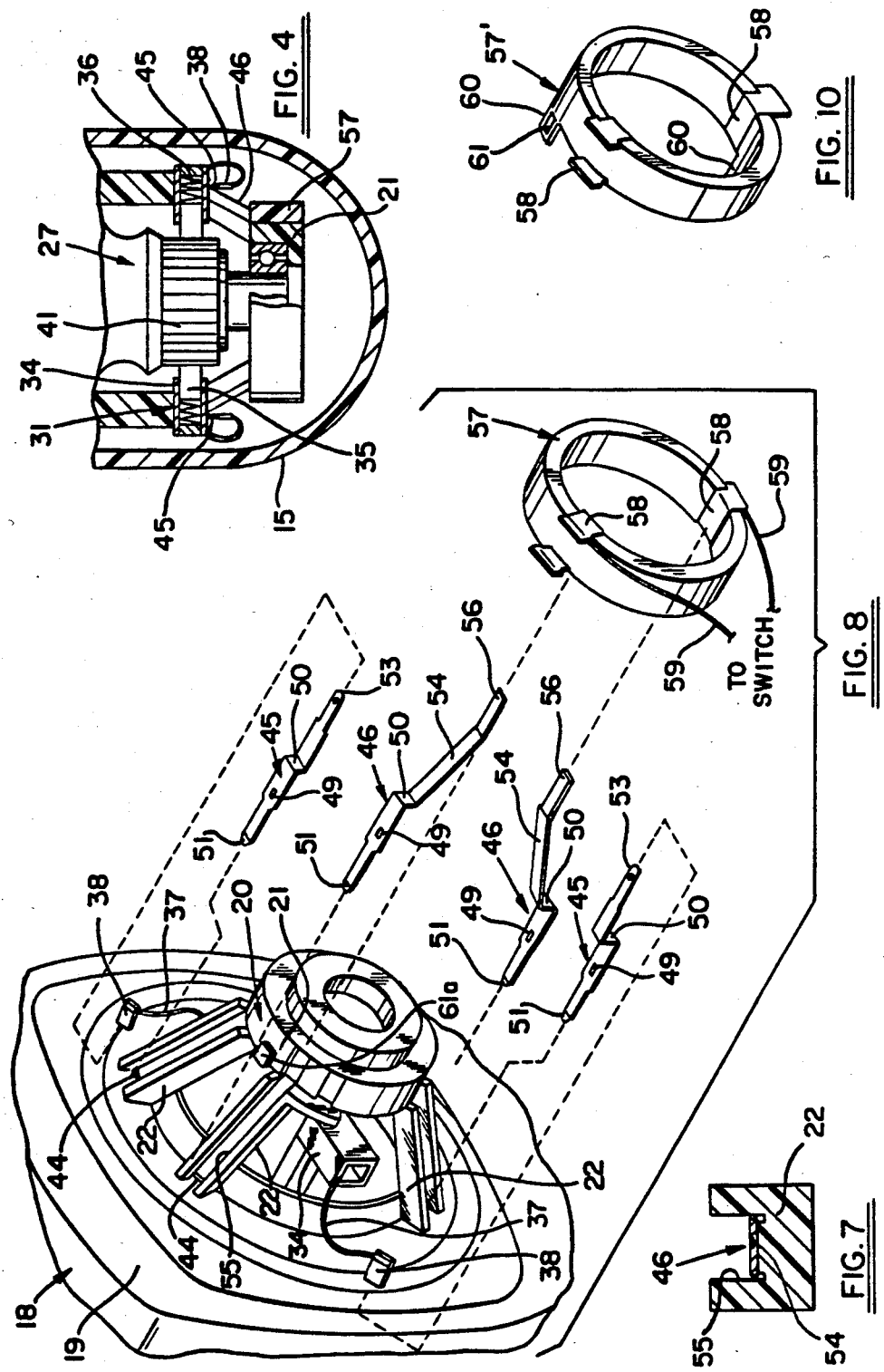

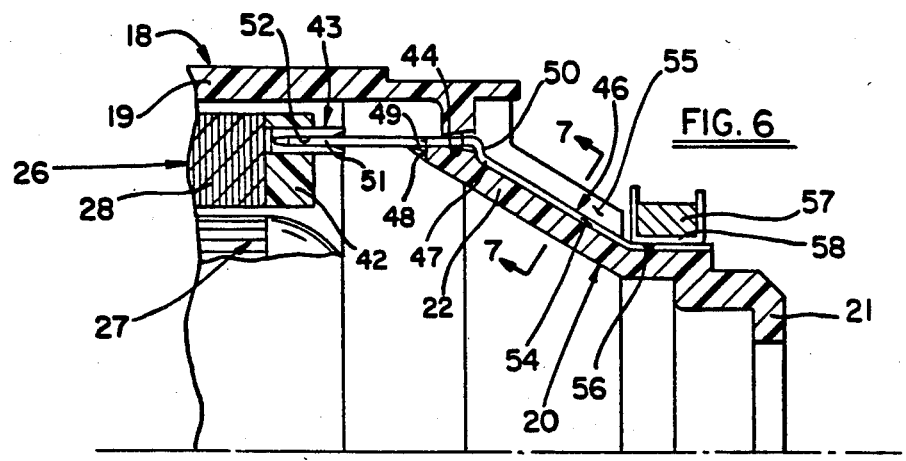
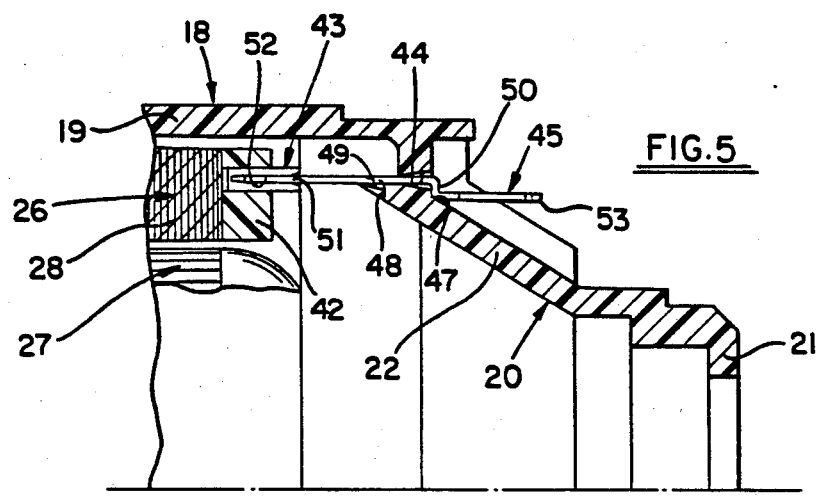
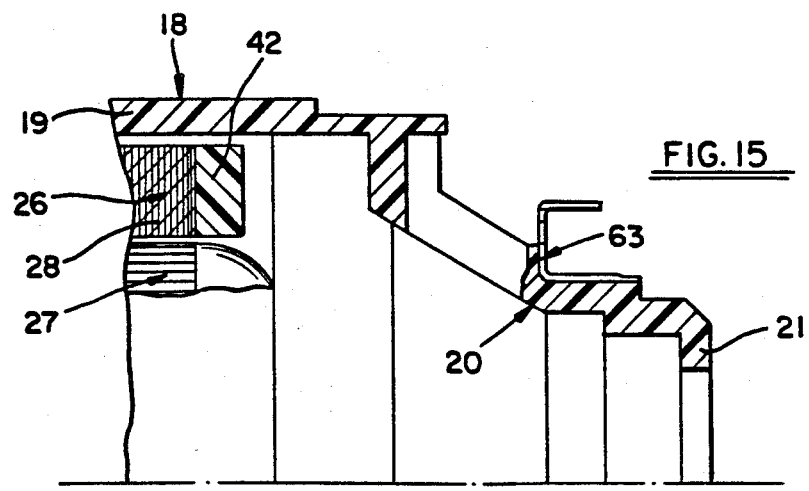

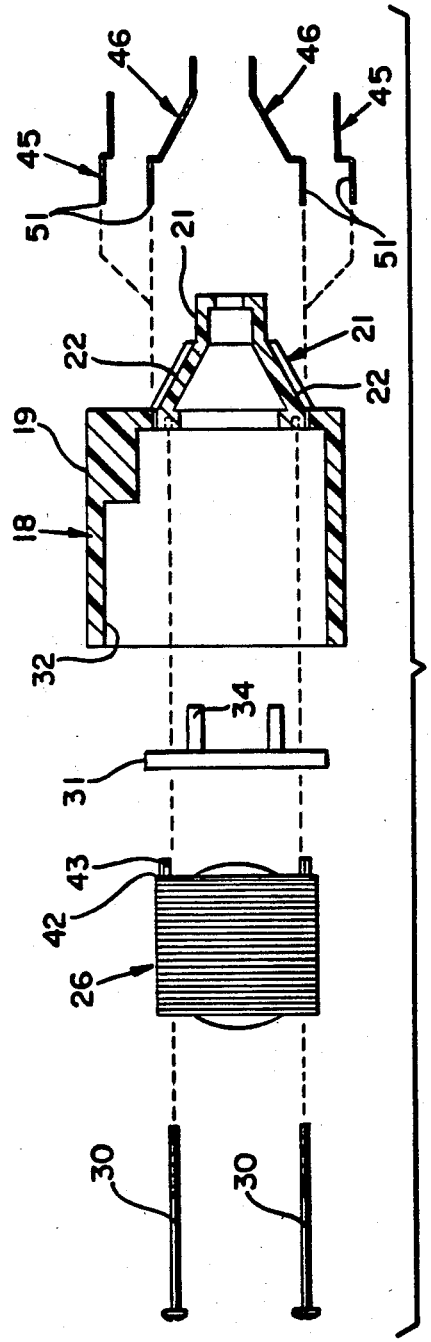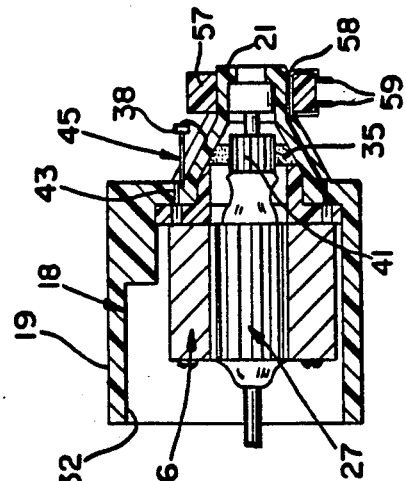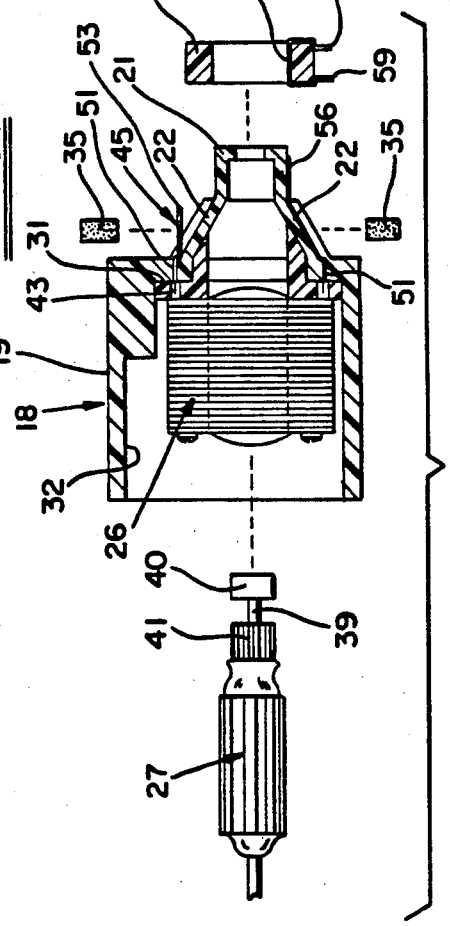

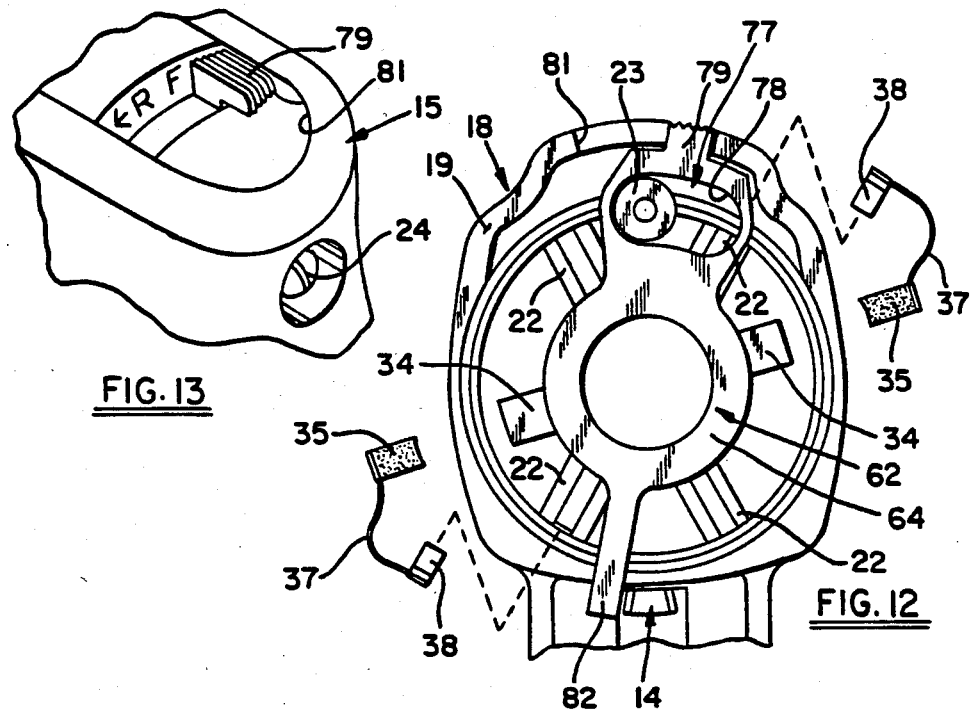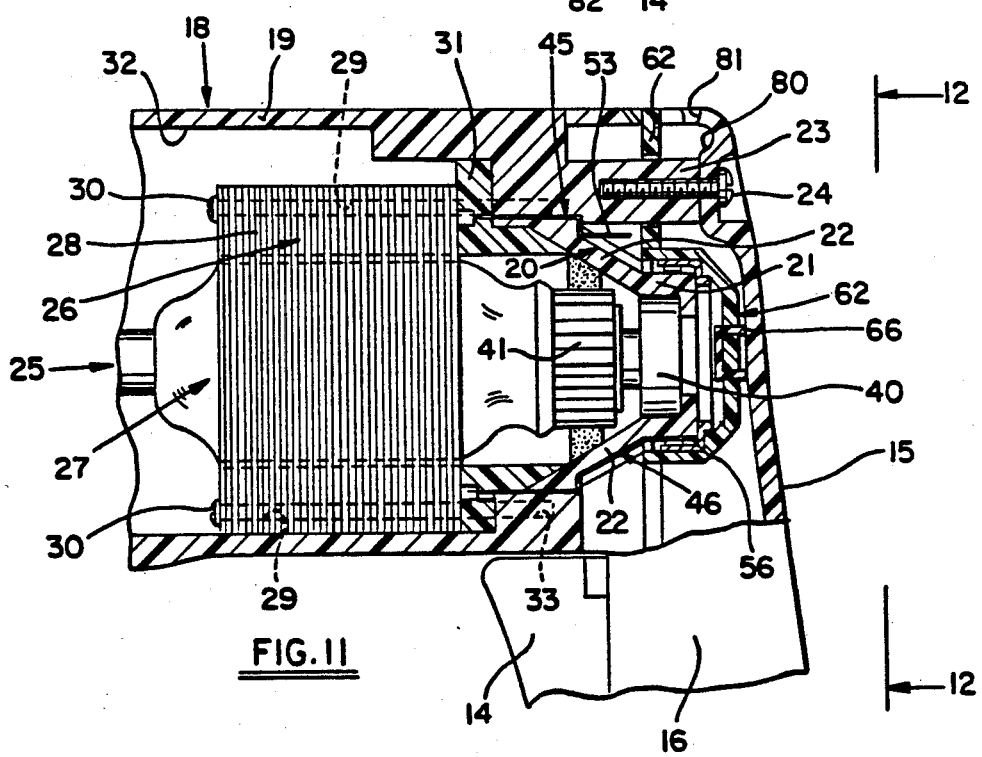

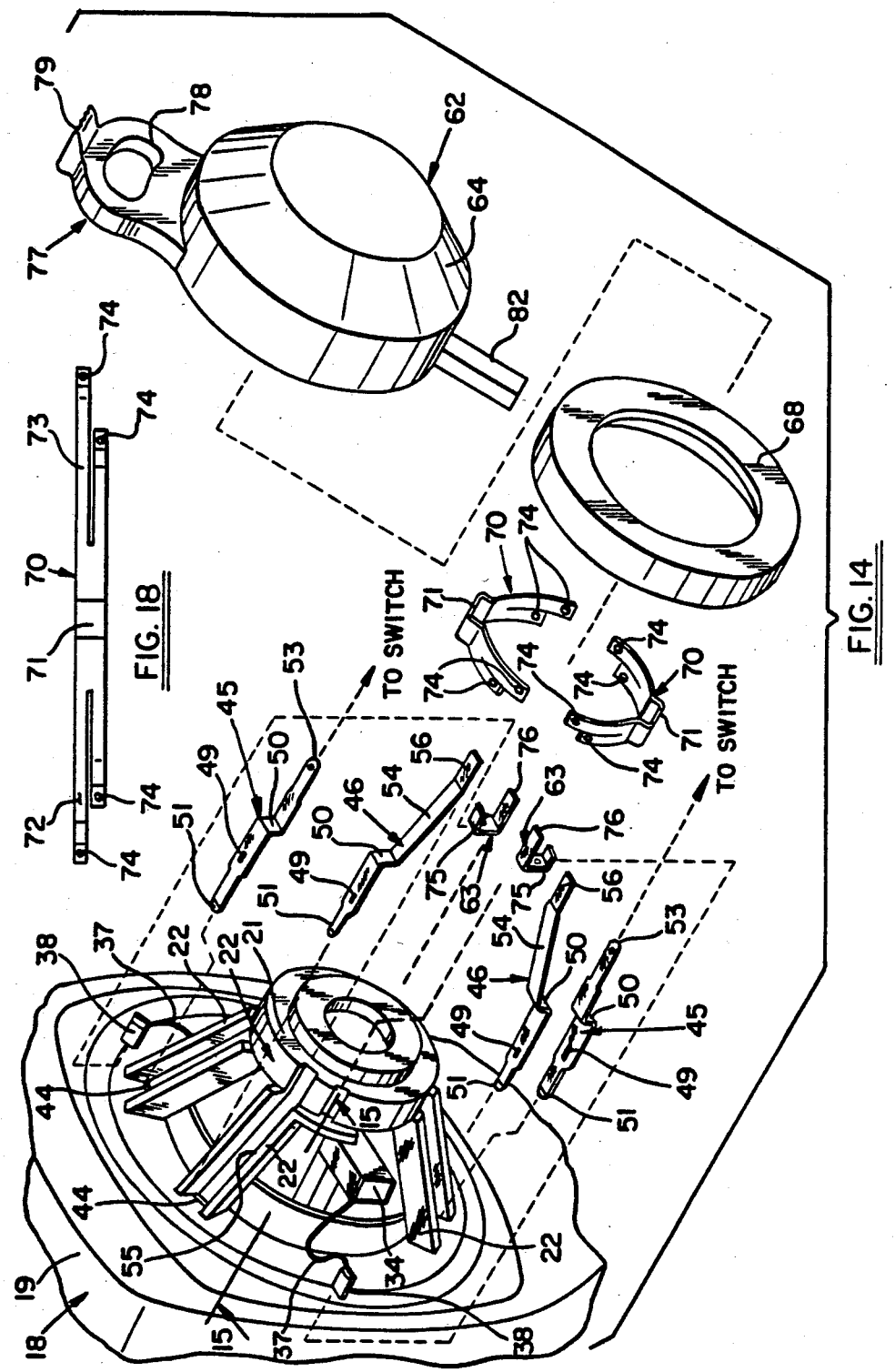

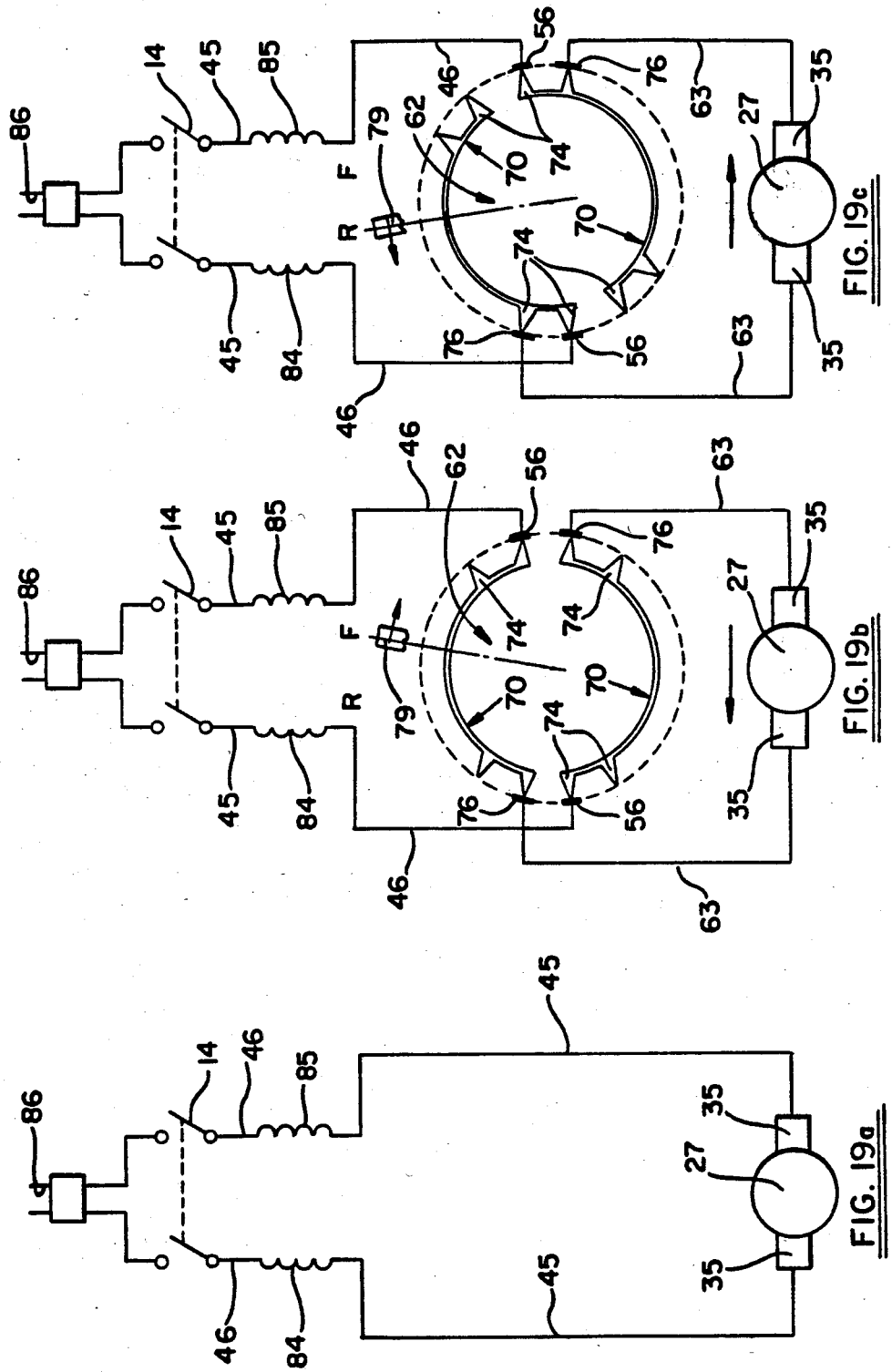

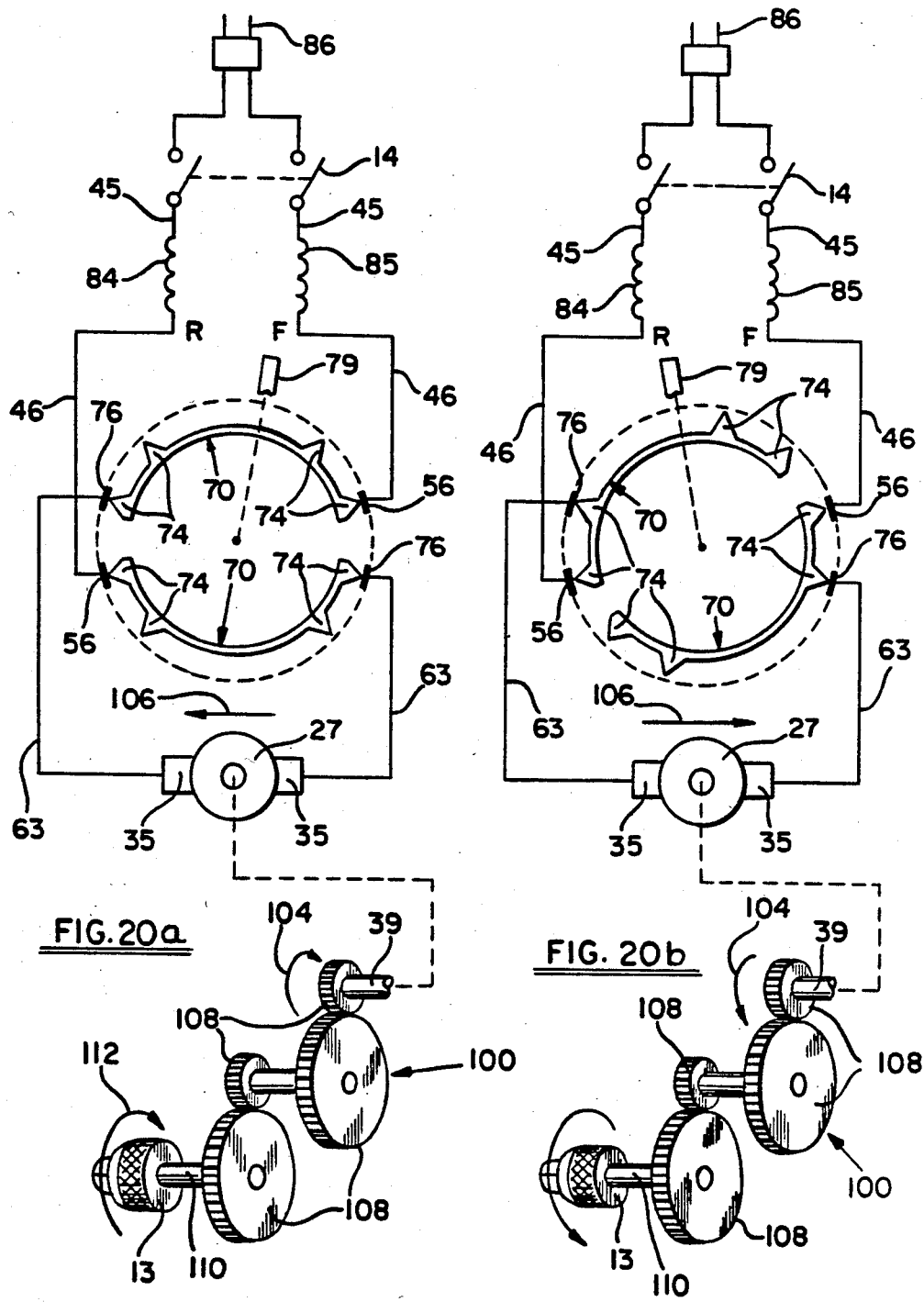

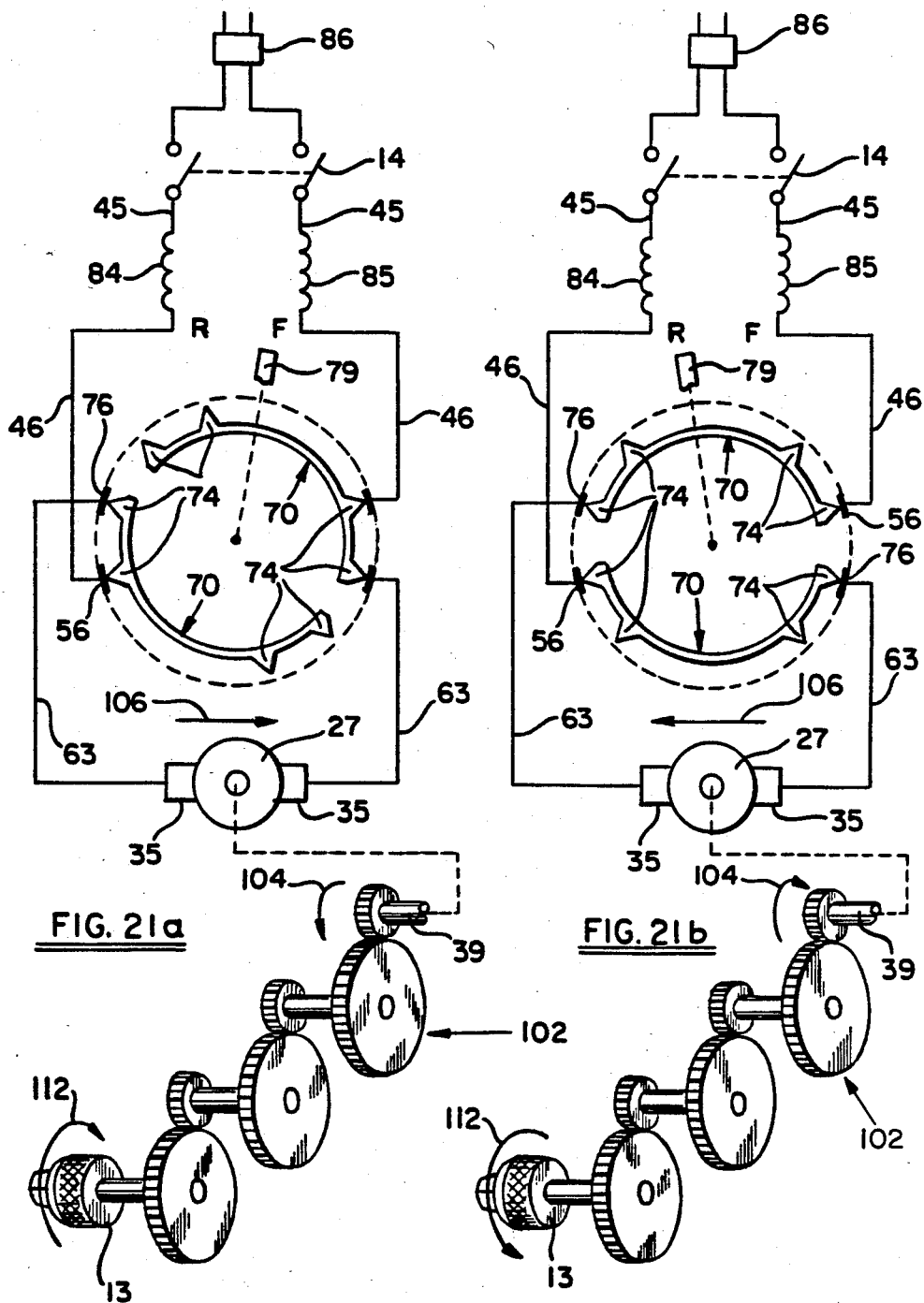

REVERSING SWITCH

This is a division, of application Ser. No. 480,781, filed Mar. 31, 1983 now U.S. Pat. No. 4,523,116.

CROSS-REFERENCE TO RELATED APPLICATION

The subject matter of this patent application is related to that disclosed in corresponding U.S. patent application Ser. No. 480,725, filed on Mar. 31, 1983, now U.S. Pat. No. 4,491,752 for Electrical Connection System for Switches, and assigned to the same assignee as the present application.

FIELD OF THE INVENTION

The present invention relates to an improved system for the electrical connection of electric motors, and more particularly, to the electrical connection of universal motors used in power tools and other devices.

BACKGROUND OF THE INVENTION

In power tools and related devices, the motor housing comprises a field case, which may be made from a dielectric or insulating material (such as a suitable plastic which may be injection molded for economy of manufacture). The field case may include an integral web portion having a rear bearing boss and further having a plurality of circumferentially-spaced bridge members joining the rear bearing boss to the generally-cylindrical main portion of the field case. The universal motor includes an armature and a field. The field is inserted within the field case and is secured therein. The armature is inserted within the field and has a shaft journaled in a bearing in the rear bearing boss. A commutator is carried on the armature shaft, and spring-loaded brushes are slidably received in respective brush holders mounted on the field case for engagement with the commutator. With this arrangement the motor wire-up must often be conducted by hand.

Also the prior art has resorted to various forms of manually-manipulatable reversing members. For example, the reversing member may be adapted to rotate a brush carrier pivotally mounted in the tool housing. Access to the reversing member is through an aperture in the tool housing.

While generally practical for the purposes intended, these structures (with or without the separate reversing mechanisms) are not readily adaptable to a wide range of power tools, appliances and other motor-driven devices for standardization of manufacture and assembly. Moreover, the electrical connection of the motors within the final product involves various wires and connections which further delay the overall assembly time, and inhibits realization of many benefits associated with automation of the assembly processes. This is especially important during the assembly of a compact power tool having relatively high motor performance and further having an overall "double insulated" design.

SUMMARY OF THE INVENTION

It is an object of the present invention to correct the disadvantages and deficiencies of the prior art by providing an improved system for the electrical connection of motors used in power tools, appliances and other motor-driven devices.

It is an additional object of the present invention to provide a set of contact strips uniquely configured to reduce motor "wire-up" time.

It is another object of the present invention to provide a standardized motor "package" and its associated electrical connection means for a wide variety of power tools, appliances and other motor-driven devices.

It is yet another objective of the present invention to provide a standardized motor "package" and its associated electrical connection means which is readily adapted to reversing or non-reversing applications.

It is also an object of the present invention to provide a drive system having a reversible electric motor and a transmission, in which compensating means operatively associated with a reversing switch accomodates a range of variations in the transmission, so that the drive shaft will rotate in a predetermined direction regardless of the number of transmission drive elements and driven elements.

It is a further object of the present invention to reduce the assembly time of motors used in power tools and other products.

It is also a further object of the present invention to effect a high degree of standardization, reduce motor assembly time, and effect overall manufacturing economies for a wide variety of power tools and other products, and to enhance opportunities for automated assembly.

Another object of the present invention is to provide an electrical connection means which facilitates a convenient compliance with the rigorous requirements of double-insulated power tools.

In accordance with the teachings of the present invention, at least two pairs of contact elements are fixedly mounted on one end of the motor housing, the housing being made of a suitable insulating material. A motor has a field which is inserted into the other end of the housing and is secured therein. The field has four terminals thereon, and these terminals automatically engage the respective contact elements as the field is inserted within the housing and is secured therein. A member which is made of insulating material is mounted on the housing. The member carries spaced contacts which automatically engage at least two of the contact elements as the member is mounted on the housing.

In accordance with the further teachings of the present invention, the member includes an annular wire harness mounted on a rear bearing boss formed integrally with the housing. The respective rearwardly-projecting ends of a first pair of the contact elements are connected to respective terminals on the brush shunts (first means for connecting the rearward end portions of one of the pairs of contact elements to the respective brushes). A pair of spaced contacts on the wire harness engage the respective rearwardly-projecting ends of the other two of the contact elements. The spaced contacts on the wire harness are connected to respective wires, and the wires are then connected to the switch to complete the electrical connection of the motor. The wire harness thereby is one form of a second means for connecting the rearward end portions of the other of the pairs of contact elements to a source of electrical energy.

Also in accordance with the further teachings of the present invention, the member may instead include a reversing subassembly mounted on the rear bearing boss for limited rotary movement thereon. First, second and third pairs of contact elements are mounted on the motor housing. The forward ends of the first and second pairs of contact elements are connected to the respective terminal means on the field. The forward ends of the third pair of contact elements are connected to respective terminals on the brush shunts. The respective rearward ends of the first pair of contact elements are connected to the switch on the tool. When the reversing subassembly is mounted on the bearing boss, the respective rearward ends of the second and third pair of contact elements are automatically connected to a pair of spaced arcuate contacts carried by the reversing subassembly. The reversing subassembly has two alternate positions in the housing, whereby the respective rearward ends of the second and third pair of contact elements ae reversibly connected to each other, respectively. Therefore, the reversing subassembly is yet another form of the first means for connecting one of the first or second pairs of contact elements to the respective brushes.

The motor housing comprises a molded field case having an integral web portion including a plurality of circumferentially-spaced bridge members joining the rear bearing boss to the generally-cylindrical main portion of the field case. Openings (or channels) are formed in the bridge members for mounting the respective contact elements therein. These contact elements are formed as bent contact strips, at least some of which are cantilever mounted on the respective bridge members.

These and other objects of the present invention will become apparent from a reading of the following description, taken in conjunction with the enclosed drawings.

BRIEF DESCRIPTION OF THE DRAWINGS

FIG. 1 is a side elevation of a typical power tool which is illustrative of one type of products to which the teachings of the present invention may be applied;

FIG. 2 is the circled portion of FIG. 1, drawn to an enlarged scale, and with parts broken away and sectioned to illustrate one embodiment of the present invention;

FIG. 3 is a rear elevation of the tool shown in FIG. 2, but with the rear handle cover removed, and showing an annular wire harness mounted on the rear bearing boss of the integral web portion of the field case;

FIG. 4 is a section view, taken along the lines 4—4 of FIG. 3 and drawn to an enlarged scale, showing the armature shaft journaled in a bearing in the rear bearing boss, and further showing the brushes mounted in respective brush holders and engaging the commutator on the armature shaft;

FIG. 5 is a section view, taken along the lines 5—5 of FIG. 3 and drawn to an enlarged scale, showing one of the first pair of contact elements carried by the respective bridge members, and further showing one of the rearwardly-projecting terminals on the field assembly which automatically engage the forwardly-projecting end portion of the respective contact element when the field subassembly is inserted within the field case and is secured therein;

FIG. 6 is a section view, taken along the lines 6—6 of FIG. 3 and drawn to an enlarged scale, showing one of the second pair of contact elements carried by the respective bridge members, and further showing a portion of the annular wire harness mounted on the rear bearing boss, the respective contact on the wire harness engaging the rearwardly-projecting end portion of the respective contact element;

FIG. 7 is a section view, taken along the lines 7—7 of FIG. 6 and drawn to an enlarged scale, and showing the respective channel-shaped bridge member for supporting one of the second pair of contact elements;

FIG. 8 is an exploded perspective, showing the integral web portion on the rear of the field case, the first and second pairs of contact elements, and the wire harness to be mounted on the rear bearing boss on the field case;

FIG. 9a, 9b, and 9c are schematic views, some in exploded form, showing the method of assembly of the conventional motor components in relation to a preferred embodiment of the electrical connection system of the present invention;

FIG. 10 is an alternate embodiment of the wire harness of FIG. 8;

FIG. 11 corresponds substantially to FIG. 2, but shows a second embodiment of the present invention, including a reversing subassembly;

FIG. 12 is a rear elevation, taken along the lines 12—12 of FIG. 11, but with the rear handle cover removed;

FIG. 13 is a partial top perspective of the rear handle cover assembled to the field case, showing the accessible portion of the reversing subassembly nested within a dwell in the rear handle cover;

FIG. 14 is an exploded perspective, similar to FIG. 8, but showing the three pairs of contact elements mounted on the integral web portion of the field case, and further showing the components of the reversing subassembly including the pair of spaced arcuate contacts;

FIG. 15 is a section view, taken along the lines 15—15 of FIG. 14 and drawn to an enlarged scale, and showing one of the third pair of contact elements carried by the respective bridge member on the web portion of the field case;

FIG. 18 is a plan layout of one of the arcuate contacts on the reversing member, showing its longitudinally-split bifurcated contact portions; and FIG. 19a, 19b and 19c are electrical schematic diagrams, respectively showing one (non-reversing) embodiment, an alternate (reversing) embodiment in its "forward" position, and the alternate (reversing) embodiment in its "reverse" position.

FIGS. 20a and 20b are elctromechanical schematic diagrams showing the operation of a double-reduction drive system of the present invention in forward and reverse, respectively.

FIGS. 21a and 21b are electromechanical schematic diagrams illustrating the compensating means of the present invention in a triple-reduction transmission, in forward and reverse, respectively.

DESCRIPTION OF THE PREFERRED EMBODIMENT

Figure 17:
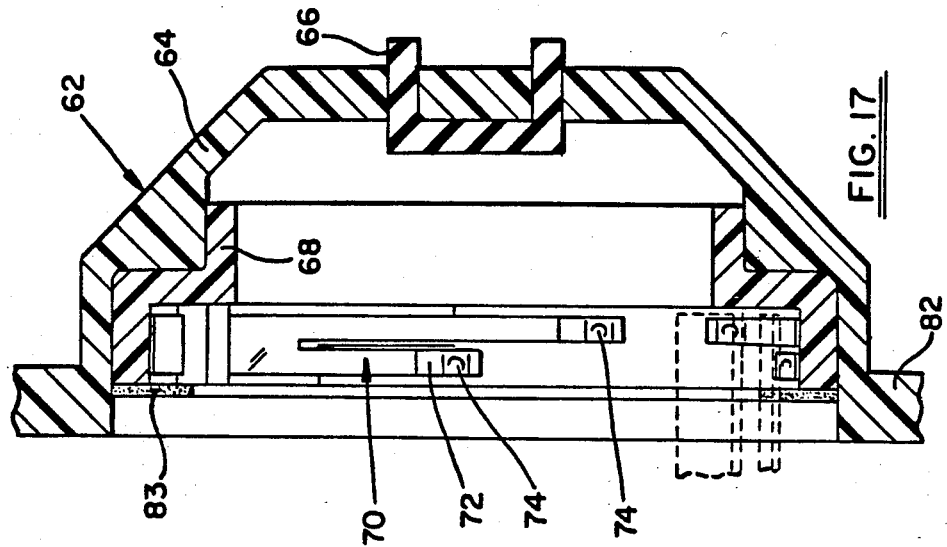
FIG. 17 is a section view, taken along the lines 17—17 of FIG. 16.

With reference to FIG. 1, there is illustrated a portable electric drill 10. It will be appreciated by those skilled in the art, however, that the scope of the present invention is not restricted thereto, but that the teachings of the present invention are equally applicable to a wide variety of power tools, appliances and other electric motor driven devices, and indeed, to a wide variety of electric motors, per se. With this in mind, the drill 10 generally comprises a motor housing 11, a gear case 12 secured forwardly of the motor housing, a chuck 13 forwardly of the gear case, a trigger switch 14 for controlling the energization of the tool, a rear handle cover 15 secured rearwardly of the motor housing, a pistol-grip handle 16 depending from the motor housing, and a strain relief means 17 depending from the handle, the strain relief means being associated with a line cord (not shown) for connection to a suitable power source.

With reference to FIGS. 2–8, the motor housing comprises a field case 18 formed from a suitable insulating or dielectric material. Preferably, the field case is injection molded from a suitable plastic material having relatively high impact strength and structural rigidity, as well as good electrical insulating qualities. The field case includes a generally-cylindrical main portion 19 and further includes a rear web portion (or spider) 20 formed integrally therewith. The web portion 20 includes an annular rear bearing boss 21, and a plurality of circumferentially-spaced inclined bridge members 22 joining the bearing boss to the main portion of the field case, as shown in FIG. 8. The field case further has a rearwardly-projecting boss 23, as shown in FIG. 2, and the rear handle cover is secured thereon by means of a fastener 24.

An electric motor 25 is housed within the field case. The motor is of the universal type and includes a stator or field subassembly 26 and a rotor or armature subassembly 27 nested therein. The field subassembly includes a field core or stack of laminations 28 having longitudinal passageways 29 for respective screws 30. The screws extend beyond the field stack, and a molded carrier 31 (for the brushes) is piloted thereon. The field stack, together with the screws and brush carrier, is inserted within the open forward portion 32 of the field case and is seated therein; and the screws are received in respective holes 33 in the rearward portion of the field case. As a result, the field subassembly is secured within the field case, and the brush carrier is retained between the field subassembly and the field case. The carrier includes rearwardly-extending brush holders 34, diametrically opposite to one another as shown in FIG. 4, for receiving respective brushes 35. The brushes are resiliently biased by respective springs 36 retained within the holders. Each of the brushes has a shunt wire 37; the end of each shunt is provided with a terminal 38. The armature has a shaft 39 journaled in a bearing 40 in the rear bearing boss. The armature shaft carries a commutator 41 shown in FIGS. 2 and 4, for engagement with the brushes. The field subassembly also includes a terminal block 42 with terminal means thereon. Preferably, the terminal means includes four terminals, one of which is shown at 43 in FIG. 5. The motor field is of the two-coil type, each of the coils having two leads (not shown) which are connected to the four terminals 43 in a suitable manner.

In accordance with the teachings of the present invention, a plurality of contact elements 45, 46 are carried on the integral rearward portion of the insulated field case. As shown in FIGS. 5 and 6, the respective bridge members have slots or openings 44 formed therein. Each of the openings 44 is formed in the upper portion of its respective bridge member, substantially adjacent to the main portion of the field case. As shown in FIG. 8, first and second contact elements, 45 and 46, respectively, are received in the respective openings in the bridge members. (These contact elements may be mounted on the housing in first and second pairs, respectively.) Each of the contact elements includes a suitably formed or bent contact strip. Each of the bridge members has a rearward ledge (or face) 47 and a forward ledge (or face) 48, adjacent to the respective openings and transverse thereto. Each of the contact strips has a main body portion formed with a downwardly-projecting lanced-out tab 49 and a downwardly-bent ledge 50. With this arrangement, and as shown more clearly in FIGS. 5 and 6, each contact strip may be inserted forwardly through its respective openings, such that its ledge 50 engages the rearward face 47, and such that its lanced-out tab springs down and engages the forward face 48, thereby axially retaining each contact strip in its respective opening with respect to the respective bridge member. The contact strips are thus cantilever mounted and have forwardly-projecting ends or end portions 51. The terminals on the field are each provided with leaf-spring female sockets 52 (or other suitable socket means) for engagement with the respective forward ends of the contact strips, as shown more clearly in FIGS. 5 and 6, thereby making electrical contact between the first and second pairs of contact strips 45, 46 and the coils on the field subassembly. This engagement and electrical connection between the contact strips and the field terminals occurs automatically upon the insertion of the field within the field case and the securing of the field therein. The first pair of contacting strips have respective cantilevered rearwardly-projecting ends or end portions 53, as shown in FIG. 5. The second pair of contact strips 46 have respective downwardly-inclined rearward portions 54 supported in complementary channels 55 formed on the respective bridge members, as shown in FIGS. 6 and 7. These inclined rearward portions have respective rear ends 56, bent thereto, and disposed adjacent to the external annular surface of the rear bearing boss.

A wire harness 57 is provided in accordance with the further teachings of the present invention. The wire harness 57 is made from an insulating material (such as a suitable molded plastic) and is annular in form, although it may take other forms as well, depending upon the shape of the motor housing. Spaced contacts 58 are mounted on the wire harness and are connected to respective conductors 59 carried thereon. The annular wire harness is received on the rear bearing boss and may be press-fitted thereon. As a result, the contacts on the wire harness engage the rearward ends of the second pair of contact strips, making electrical connection thereto, as the rearward ends of the contact strips are wedged between the bearing boss and the contacts on the wire harness (as shown in FIGS. 6, 9b and 9c). The wires on the wire harness are then connected to the switch (in a conventional manner), which is ultimately connected to a source of electrical energy.

Thus, it will be appreciated that the first and second pairs of contact strips 45 and 46, respectively, in combination with the wire harness 57, greatly facilitate the connection of the field to the brushes and to the switch leading to the power source. The formed contact strips are easily inserted into the integral web portion of the field case; the terminals on the field automatically engage the respective contact strips when the field is inserted into the field case and is secured therein; the terminals on the brush shunts are readily slipped over two of the contact strips and connected thereto; the wire harness is mounted on the rear bearing boss for automatic engagement with the remaining two contact strips on the web; and finally, the wires on the wire harness are connected to the switch in the usual manner. With this arrangement, a plethora of loose wires is eliminated; assembly and electrical connection time are substantially reduced; and the motor connections are standardized for a wide variety of power tools, appliances or other motor-driven devices. Thus opportunities for automated assembly are enhanced, since most of the assembly motions described above are in directions parallel to the axis of the motor. Thus each brush shunt is a first means for connecting the rearward end portions of one of the first or second contact elements (or pairs of contact elements) to at least one of the brushes; and the wire harness is a second means for connecting the rearward end portion of the other of the contact elements (or pairs of elements) to a source of electrical energy.

With reference to FIGS. 9a, 9b, and 9c, the advantages and benefits of the improved apparatus and method of the present invention will be readily appreciated. As shown in FIG. 9a, the contact strips 45 and 46 are mounted on the rearward portion of the field case 18, being slipped into their respective openings 44 in the bridge members 22. The mounting screws 30 are slipped into the field subassembly 26, extending therethrough, and the brush carrier 31. The field subassembly (with the brush carrier) is inserted through the open forward portion 32 of the field case, is seated therein, and the screws are driven into the field case. In this manner the four terminals 43 on the field automatically engage (and hence make electrical connection) to the cantilevered forward ends 51 of the four contact strips 45, 46, as shown in FIGS. 6, 9b, and 9c. The armature 27 is inserted within the field, such that its commutator-end bearing 40 is received within the rear bearing boss 21, and when the armature is in place, the brushes 35 are released to engage the commutator 41. The brush shunt terminals 38 are connected to the cantilevered rearward ends 53 of the first pair of contact strips 45. The wire harness 57 is mounted on the rear bearing boss 21, such that its contacts 58 are wedged against (and hence make electrical connection with) the rear ends 56 of the remaining (second) pair of contact strips 46. The wires 59 on the wire harness 57 are then connected to the switch.

With reference to FIG. 10, a modified wire harness 57' includes means for retaining the annular harness or member on the housing, including a pair of substantially diametrically-opposed resilient latch members 60 formed integrally therewith. These latch members define latch apertures 61 and project forwardly of the wire harness. The latch members 61 are sufficiently flexible, such that the latch member may be flexed slightly (outwardly) as the wire harness 57' is slipped over the rear bearing boss 21. The respective latch apertures 61 engage latch bosses 61a on the bearing boss (as shown in FIG. 8) and the wire harness 57' is retained on the bearing boss with a "snap action". Moreover, if desired, the wire harness 57' may be provided with a suitable key (not shown) for cooperation with a corresponding keyway on the bearing boss (again, not shown) to assure the proper circumferential position of the wire harness on the bearing boss for proper engagement between the contacts 58 and the ends 56 on the second pair of contact strips 46. Moreover, and again if desired, the shape of the wire harness could be other than annular, and could be fixedly mounted elsewhere within the housing.

With reference to FIGS. 11–18, a second embodiment of the present invention is provided. In this second embodiment, a reversing subassembly 62 is used in lieu of a wire harness, and a third bent contact strip 63 is mounted on the bridge as shown in FIGS. 14 and 15. (Again, the third contact strip may be mounted on the housing in third pairs of contact elements.) The reversing subassembly 62 includes an outer (or first) reversing member 64 which is a support member preferably made from an insulating material, such as a suitable molded plastic. This first reversing member 64 has means for rotatably retaining the reversing subassembly on the rear portion of the housing, including a resilient plug 66 shown in FIG. 17, and which is engaged by a portion of the handle 15, as shown in FIG. 11. The resilient plug 66 therefore acts as a vibration isolation means between the handle and the rest of the tool. In this manner, the outer reversing member is mounted on the bearing boss for a limited rotary or pivoted movement thereon, but is precluded from axial dislodgement therefrom.

Figure 16:
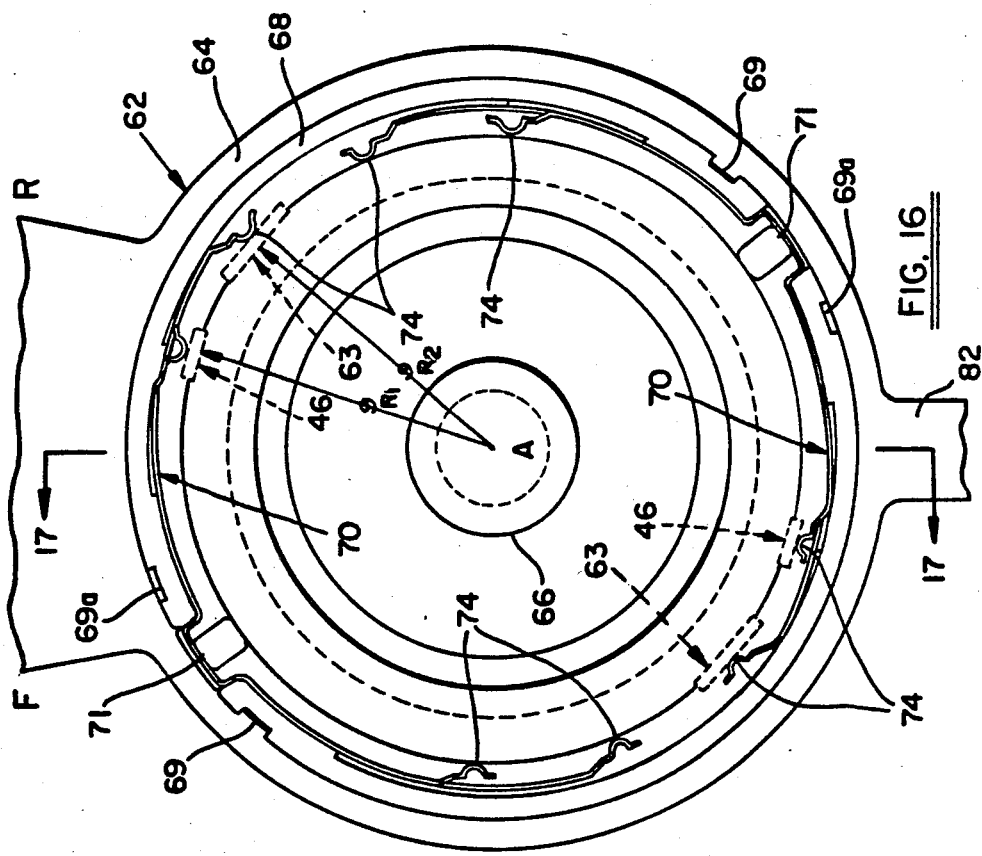
FIG. 16 is a front elevation of the reversing member, (looking from field rearwardly towards the handle) in its assembled form and drawn to an enlarged scale, the broken lines showing the respective rearwardly-projecting end portions of the second and third pair of contact elements for reversibly engaging the respective pair of spaced arcuate contacts on the reversing subassembly.

An inner (or second) reversing member 68 is nested within the outer reversing member, as shown in FIGS. 16 and 17, and is keyed thereto (as at 69) for conjoint limited rotary movement therewith. This inner reversing member is also made from an insulating material, such as a suitable molded plastic. A pair of curved contact means, or spaced-apart arcuately-formed reversing contacts 70 are carried by the inner reversing member, and are mounted transverse to the plane of the reversing member. These reversing contacts 70, as shown in FIG. 18, each have a central portion 71 and longitudinally-split bifurcated contact-engaging ends 72 and 73, respectively. Each of these ends are in turn provided with respective dimples 74 for engagement with the respective rearwardly-projecting ends of the second and third pair of contact strips, 46 and 63, respectively, as shown in FIG. 16. Also as shown in FIG. 16, this bifurcated configuration is part of a means for compensating for tolerance buildup associated with the potential differences in radial distances $R_1$, $R_2$ to the respective ends 56, 76 of the cantilever-mounted contacts 46, 73. Where $R_1$ does not equal $R_2$, a single cantilever-mounted curved contact strip could engage strip 46, and be levered out of engagement with strip 63. Therefore by splitting contact strip 70 into two strips of different lengths, the strips are self-biased, more or less independently, against contact elements 46, 63, thereby taking up variations in their respective radial distances from the axis "A" of the subassembly, and accommodating stress due to the amount of deflection in the free ends of the strips. Further, and as shown in FIG. 14, the rearwardly-projecting ends 53 of the first pair of contact strips 45 are connected to the switch (in a suitable manner); the forward ends 75 of the third pair of contact strips 63 (shown in FIGS. 14 and 15) are connected to the brush shunt terminals 38; and the forwardly-projecting ends of the first and second pairs of contact strips 45 and 46, respectively, automatically engage the four terminals 43 on the field (as in the first embodiment of FIGS. 2–8). The rearwardly-projecting respective ends 56 and 76 of the second and third pairs of contact strips, 46 and 63, are alternately connected to the arcuate reversing contacts 70 for reversing the electrical connections between the field and the armature for reversing the motor rotation in the conventional manner. Thus the reversing subassembly includes reversing means for selectively interconnecting the respective rearward end portions of the second and third pairs of contact elements to change the direction of rotation of the armature. However it should be noted that reversing subassembly 62 need not include discrete reversing members 64, 68. Instead, members 64, 68 may be integrally molded as one unit. Thus the reversing subassembly is yet another form of the first means for connecting the rearward end portions of one of the first or second contact elements (or pairs of contact elements) to at least one of the brushes.

With reference again to FIGS. 12-14, the reversing subassembly 62 has a radially-extending integral portion or switch operator 77 which is formed with a generally oval aperture 78 within which the rearwardly-projecting boss 23 on the field case is received. The integral portion 77 is further provided with a manually-manipulated portion or serrated reversing button 79 which passes through an opening 80 in the rear switch cover and is nested within a dwell 81 therein (as shown in FIG. 13). The reversing subassembly also has a downwardly-projecting integral tab 82 for interlocking engagement with the switch, thereby precluding movement of the reversing subassembly in the "on" position of the switch. As shown in FIG. 17, if desired, a felt washer 83 may be trapped between the reversing subassembly and the field case to minimize the flow of dirt or dust particles to the reversing contacts and the rearwardly-projecting ends of the respective contact strips.

With reference to the schematic diagrams of FIGS. 19a, 19b, and 19c, the electrical interconnection of the present invention will be further appreciated. In the non-reversing embodiment of FIG. 19a, the first contact elements 45 connect the field coils 84, 85 to the brushes 35 on the armature 27, and the second contact elements 46 connect the field coils to the switch 14 (via the wire harness 57) to the power source 86. In the reversing embodiment shown in FIGS. 19b and 19c, the first contact elements 45 now connect the field coils 84, 85 to the switch 14, and the second contact elements 46 and third contact elements 63 reversibly connect the field coils 84, 85 to the brushes 35 via the reversing subassembly 62. The reversing subassembly has two alternate positions; the first or "forward" position is shown in FIG. 19b, and the second or "reverse" position is shown in FIG. 19c.

Another advantage of the electrical interconnection and reversing systems of the present invention is the creation of a drive system having compensating means for causing the output shaft to rotate in a predetermined direction responsive to movement of the reversing switch from a first (forward) position to a second (reverse) position, for any given number of transmission drive elements. This feature is illustrated in FIGS. 20a and 20b, showing a double-reduction transmission 100, and in FIGS. 21a and 21b, which illustrate a triple-reduction transmission 102.

The drive system schematically shown in FIG. 20a includes armature shaft 39, which rotates in one direction indicated by arrow 104 (corresponding to the current direction indicated by arrow 106), when the reversing switch is in its "forward" or first position. The drive system further includes "N" number of drive elements 108 which form a transmission connecting the armature shaft 39 to the output shaft 110, which rotates in a predetermined direction indicated by arrow 112. Referring now to FIG. 20b, when the reversing switch is moved to its second or "reverse" position, the current flow 106 is reversed, thereby reversing the armature shaft direction of rotation 104 and the output shaft direction of rotation 112. However, it is now necessary to address the problem posed when the drive system for a particular application includes "N+1", "N+2" or another number of drive elements 108, since changing the number of drive elements from one application to another will result in changing the direction of rotation 112 of the output shaft 110 for a given direction of current flow. Also it is desirable to maintain the orientation of the "forward" and "reverse" positions of switch reversing button 79 with respect to the housing configurations, as shown in FIG. 13, whether the particular power tool or other application contains a double- or triple-reduction transmission. The solution to the problem is the compensating means shown in FIGS. 21a and 21b, and in FIG. 16. Referring now to FIG. 16, an alternate keyway 69a is formed at diametrically opposite points on the inner (reversing) member 68, and is spaced circumferentially approximately 25° from keyway 69. Recalling that FIG. 16 is taken looking rearwardly from the field, and that FIGS. 20a, 20b, 21a and 21b are taken looking forwardly toward the field, it can be appreciated that if the subassembly of curved contact strips 70 and (inner) reversing member 68 is first rotated 25°, and then assembled so that alternate keyway 69a is now located at the position formerly occupied by keyway 69, the curved contact strips 70 will therefore be selectively oriented or locatable with respect to the respective contact elements 56, 76, (and to the first and second switch positions) as shown in FIGS. 21a and 21b. The result is a change in direction of current flow, as seen when comparing FIG. 21a with FIG. 20a, and FIG. 21b with FIG. 20b. Therefore when it is desired to use the subject invention in conjunction with a triple-reduction reversing power tool instead of a double-reduction reversing power tool, the tool is assembled with a reversing subassembly utilizing keyway 69a as just described, thereby yielding the same predetermined direction of rotation for output shaft 110 as was generated in the double-reduction system. This can be seen by again comparing FIG. 21a with FIG. 20a, and FIG. 21b with FIG. 20b. It can be appreciated that this feature of the present invention is applicable not only to drive systems utilizing gear trains, but to belt drives, chain drives, rollers, threads, and others.

However it should be noted then if the reversing subassembly 62 does not include two discrete members 64, 68, but rather is composed of a single integrally-molded member, compensation for variations in the number of transmission elements can be effected by molding two types of reversing members, such that one type orients the reversing contacts 25° with respect to the other type.

Thus it will be appreciated that the first and second pairs of contact elements (strips 45 and 46, respectively) are used in both embodiments, that is, the non-reversing embodiment of FIGS. 2-8, and reversing embodiment of FIGS. 11-18. In the non-reversing embodiment, the wire harness 57 (or 57') is used; and in the reversing embodiment, the reversing subassembly 62 is used in addition to the third pair of contact elements (strips 63). Preferably, both the wire harness 57b and the reversing subassembly 62 are mounted on the rear bearing boss. In each case, the pairs of respective contacts 58 and 70 carried by the wire harness and reversing subassembly, respectively automatically engage (and make electrical contact with) the respective rearward ends of the appropriate contact elements. The contact elements are mounted on the integral web portion of the field case; and in each case, the forward ends of two pairs of contact elements automatically engage (and make electrical contact with) the four terminals on the field, when the field is seated within the field case and is secured therein. As a result, the electrical connections for the motor are greatly simplified; standardization is assured for a wide variety of motors, both reversing and non-reversing; production economies are realized; and the quality, reliability and serviceability of the end product are substantially improved.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A reversing switch for an electrical device having a housing, comprising: a support member, means for rotatably mounting the support member on the housing, means formed on the housing and the support member for restricting the movement of the support member to thereby accommodate a limited pivotal movement of the support member relative to the device, a pair of spaced-apart reversing contacts wherein the major flat surfaces of the contacts are formed in a prescribed arc to provide a natural resiliency in the contacts, the contacts carried by the support member, each of the reversing contacts having bifurcated end sections formed in a continuation of the prescribed arc in end portions of the reversing contacts, two pairs of contact means, and means for mounting the two pairs of contacts on the device and in position for selective engagement, alternately, with the bifurcated sections of the respective end portions of the reversing contacts.

2. The reversing switch of claim 1, wherein: the support member including a first portion and a second portion, and further comprising the reversing contacts carried by the first portion, means on the first portion for locating the pair of reversing contacts thereon, and means for keying the first and second portions together to place the reversing contacts in predetermined relationship to the contact means.

3. The reversing switch of claim 1, wherein: the support member being rotatable in a plane, and the reversing contacts being mounted transverse to said plane.

4. A reversing switch for an electrical device having a housing, comprising: a support member, means for rotatably mounting the support member on the housing, means formed on the housing and the support member for restricting the movement of the support member to thereby accommodate a limited pivotal movement of the support member relative to the device, spaced-apart reversing contacts mounted within the support member and formed to provide a natural resiliency in the contacts, the housing for the device including a portion having an external annular surface, two pairs of contact elements fixedly mounted on the housing, each of the contact elements having respective end portions supported on the external annular surface of the housing portion, and the contact elements being mounted on the housing in position for alternately engaging the respective reversing contacts, the respective contact elements being wedged in a radial direction between the housing portion and the support member of the reversing switch.

5. The reversing switch of claim 4, wherein: the support member including a first portion and a second portion, and further comprising the reversing contacts mounted within the first portion, means on the first portion for locating the reversing contacts thereon, and means for keying the first and second portions together to place the reversing contacts in predetermined relationship to the contact means.

6. The reversing switch of claim 4, wherein: the support member being rotatable in a plane, and the reversing contacts being mounted transverse to said plane.

7. The reversing switch of claim 4, wherein: each reversing contact including a generally arcuate member made from relatively thin-gauge metal, and the arcuate member including respective end portions.

8. The reversing switch of claim 7, wherein: the end portions being longitudinally slotted to form bifurcated sections.

9. The reversing switch of claim 8, wherein: one of the bifurcated sections of one end portion being longer than the other bifurcated section of the one end portion.

10. The reversing switch of claim 7, wherein: the arcuate member including a "U"-shaped intermediate portion joining respective end portions.

11. The reversing switch of claim 10, wherein: the respective end portions of the arcuate member describing an arc, and the "U"-shaped intermediate portion being located substantially radially outwardly of said arc.

12. The reversing switch of claim 7, wherein: the end portions including bent contact-engaging surfaces for engagement with electrical contacts of the electrical device.

13. The reversing switch of claim 12, wherein: the respective end portions describing an arc, and the bent contact-engaging surfaces describing arcuate portions located generally radially inwardly of said arc.

* * * * *